United States Patent [19]
Ito

[11] Patent Number: 5,900,253
[45] Date of Patent: May 4, 1999

[54] MAMMALIAN EXCREMENT TREATING MATERIAL AND PROCESS FOR PRODUCING THE SAME

[75] Inventor: Hiroshi Ito, Tokyo-to, Japan

[73] Assignee: Kabushikikaisha Daiki, Japan

[21] Appl. No.: 08/793,880

[22] PCT Filed: Jul. 12, 1996

[86] PCT No.: PCT/JP96/01955

§ 371 Date: Jul. 9, 1997

§ 102(e) Date: Jul. 9, 1997

[87] PCT Pub. No.: WO97/02738

PCT Pub. Date: Jan. 30, 1997

[30] Foreign Application Priority Data

Jul. 12, 1995 [JP] Japan .................................. 7-207298
Dec. 29, 1995 [JP] Japan .................................. 7-354912

[51] Int. Cl.$^6$ ...................................................... A61K 9/14
[52] U.S. Cl. ...................... 424/489; 424/76.5; 424/76.6; 424/76.21
[58] Field of Search ................ 424/489, 76.21, 424/76.5, 76.6; 210/188, 104

[56] References Cited

FOREIGN PATENT DOCUMENTS

| 60-237926 | 11/1985 | Japan . |
|---|---|---|
| 1-191626 | 8/1989 | Japan . |
| 2-265968 | 10/1990 | Japan . |
| 5-260873 | 10/1993 | Japan . |
| 6-22659 | 2/1994 | Japan . |
| 6-78643 | 3/1994 | Japan . |
| 7-31314 | 2/1995 | Japan . |

*Primary Examiner*—Thurman K. Page
*Assistant Examiner*—William E. Benston, Jr.
*Attorney, Agent, or Firm*—Ostrolenk, Faber, Gerb & Soffen, LLP

[57] ABSTRACT

In order to effectively utilize a paper diaper waste having a high calorific value as a raw material for forming a mammalian excrement treating article having a calorific value enough to enable the article to be incinerated or burnt up even after being used, the mammalian excrement treating article is produced in a granular form from a paper diaper waste powder having a particle size of 5 mm or less, and an organic compounding material.

40 Claims, 2 Drawing Sheets ers 5,900,253

MAMMALIAN EXCREMENT TREATING MATERIAL AND PROCESS FOR PRODUCING THE SAME

TECHNICAL FIELD

The present invention relates to a mammalian excrement treating article made using a paper diaper waste as a raw material, and particularly, to a mammalian excrement treating article which is made using as a raw material, paper diaper and menstrual napkin wastes as defective articles produced in a course of production of a paper diaper and a menstrual napkin, which has a water retention function and an insecticidal function, and which can be incinerated or burnt up in a water-containing state after being used.

The present invention also relates a mammalian excrement treating article which is made using as a starting material, paper diaper and menstrual napkin wastes as defective articles produced in a course of production of a paper diaper and a menstrual napkin, and which has an insecticidal function for exterminating noxious insects adhered to the body of a mammal, particularly, a domestic pet animal, from the mammalian body, and for preventing noxious insects from being adhered to the mammalian body by use thereof at the time of excrement.

BACKGROUND ART

Depending upon the type of product, a paper diaper generally comprises 40 to 50% by weight of cotton-like pulp such as a pulverized pulp, an absorbing sheet of paper and the like, 20 to 30% by weight of a high-molecular absorber such as a highly water-absorbable resin, 10 to 15% by weight of non-woven fabric such as a face polyethylene, polyethylene terephthalate, rayon MIX and PETMIX, etc., 10 to 15% by weight of a water-proof material of a polyethylene film, a calcium carbonate-incorporated polyethylene film, etc., and 5% by weight of a tape such as a furnishing tape, a release tape, a target tape, or an elastic yarn such as spandex, or tape of adhesive such as hot melt and the like.

For example, the paper diaper is formed by placing an absorbing band containing a mixture of a fuzz, i.e., a fluff made of a pulverized pulp and a highly water absorbable resin in a tissue, onto a polyethylene film at a predetermined place, and sealing an upper surface of such package, for example, by putting a non-woven fabric of polyethylene thereover. Rubber is attached around the waist or leg thereof, and tape fasteners are mounted on opposite side of the back thereof. Tensioning support tapes are mounted in correspondence to the respective tape fasteners.

The disposal paper diaper having such a structure is checked by a check a cross-over cut check, a tape position check, a metal detection check and the like, thereby rejecting the defective articles, but the amount of such wastes is increased to very large amount.

The paper diaper waste includes, for example, the polyethylene film, the non-woven fabric of polypropylene and the rubber in amounts of about 30% by weight; the highly water absorbable resin in an amount of about 25% by weight; and the pulp powder and the tissue in amounts of about 50% by weight. Therefore, if the paper diaper waste remains as it is, such waste does not find an application, and must be subjected to a classification, thereby separating the polypropylene, the polyethylene, the tissue and the rubber from the highly water-absorbable resin and the pulp, For this reason, most of the paper diaper wastes is incinerated or burnt up.

However, the paper diaper waste has a calorific value as high as 5,000 to 6,000 K Cal/kg and hence, must be separated from the common refuse. In addition, even when the paper diaper wastes are burnt up, they must be burnt up in mixture with other refuse, which causes a problem. It is an object of the present invention to solve the problems concerning the discarding disposal of the paper diaper wastes. It is another object of the present invention to provide a granular mammalian excrement treating article which is capable of being incinerated or burnt up even in a water-containing state after use.

The present inventors have found that if the polyethylene film, the non-woven fabric of polypropylene and the rubber are pulverized into a particle size of 5 mm, preferably, 2 mm or less, the powder resulting from the pulverization has a water-absorbability and a water retention which are significantly increased, as compared with those before the pulverization, and the paper diaper waster has a high calorific value, but if the paper diaper waste is used as a starting material for the mammalian excrement treating material, the excreted urine is retained by the water-absorbable resin contained in the paper diaper waste and hence, even if the paper diaper waste has such a high calorific value, the paper diaper waste is suitable for incinerating treatment, because the calorific value is lowered by the contained water. Thus, the present inventors have reached the accomplishment of the present invention.

DISCLOSURE OF THE INVENTION

The present invention provides a mammalian excrement treating article which is formed into a granular shape and comprises a powder of a paper diaper waste having a particle size of 5 mm or less, and an organic compounding material. Thus, the paper diaper waste having a high calorific value and the organic compounding material in combination are utilized to enable the incineration of the article. According to the present invention, a pyrethloid-based insecticide is contained in a smaller amount than the water-absorbable resin contained in the mammalian excrement treating article, and the paper diaper waste having a high calorific value and the like is utilized to enable the incineration of the article, whereby noxious insects adhered to the mammal are exterminated from the mammalian body. According to the present invention, there is provided a mammalian excrement treating article comprising a granular core section containing a paper diaper waste power having a particle size of 5 mm or less and an organic compounding material, and a covering layer section covering the granular core section and containing a paper power and a water-absorbable resin, the excrement treating article being formed granularly by the granular core section and the covering layer section. Thus, the paper diaper waste having a high calorific value is utilized as an incineratable useful material, and the water absorbing performance is enhanced efficiently.

According to the present invention, the mammalian excrement treating article is formed into a granular shape and comprises a paper diaper waster powder having a particle size of 5 mm or less, an organic compounding material and an inorganic compounding material. Thus, both of the paper diaper waste having a high calorific value and the organic waste of the organic compounding material are utilized to enable the incineration of the article. According to the present invention, pyrethloid-based insecticide is contained in a smaller amount than the water-absorbable resin contained in the mammalian excrement treating article, and the paper diaper waste having a high calorific value and the like are utilized to enable the incineration of the article, whereby noxious insects adhered to the mammal are exterminated from the mammalian body.

According to the present invention, there is provided a mammalian excrement treating article comprising a granular core section containing a paper diaper waste, an organic compounding material powder and an inorganic compounding material powder, and a covering layer section containing a paper powder and a water-absorbable resin and formed on a surface of the granular core section, the article being formed into a granular shape by the granular core section and the covering layer section. Thus, the paper diaper waste having a high calorific value and the like are utilized to enable the incineration of the article, and the water absorbing performance is enhanced efficiently. Further, according to the present invention, a water absorbable resin is contained in a larger amount in the granular core section containing the paper diaper waste powder and the organic and inorganic compounding material powders, than contained in the paper diaper waste powder, whereby the paper diaper waste having a high calorific value and the like are utilized to enable the incineration of the article, and the operation at the time of the formation is smoothed and further, the water absorbing performance is enhanced efficiently.

Further, according to the present invention, there is provided a process for producing a mammalian excrement treating article, comprising the steps of pulverizing a paper diaper waste into a powder having a particle size of 5 mm or less, mixing the resulting powder with an organic compounding material, and granulating the mixture. In addition, according to the present invention, there is provided a process for producing a mammalian excrement treating article, comprising the steps of pulverizing a paper diaper waste into a powder having a particle size of 5 mm or less, mixing the powder with an organic compounding material and a water-absorbable resin, and granulating the mixture. Thus, the paper diaper waste having a high calorific value is utilized for forming the useful mammalian excrement treating article to enable the incineration of the latter.

BEST MODE FOR CARRYING THE INVENTION

Figure 1:
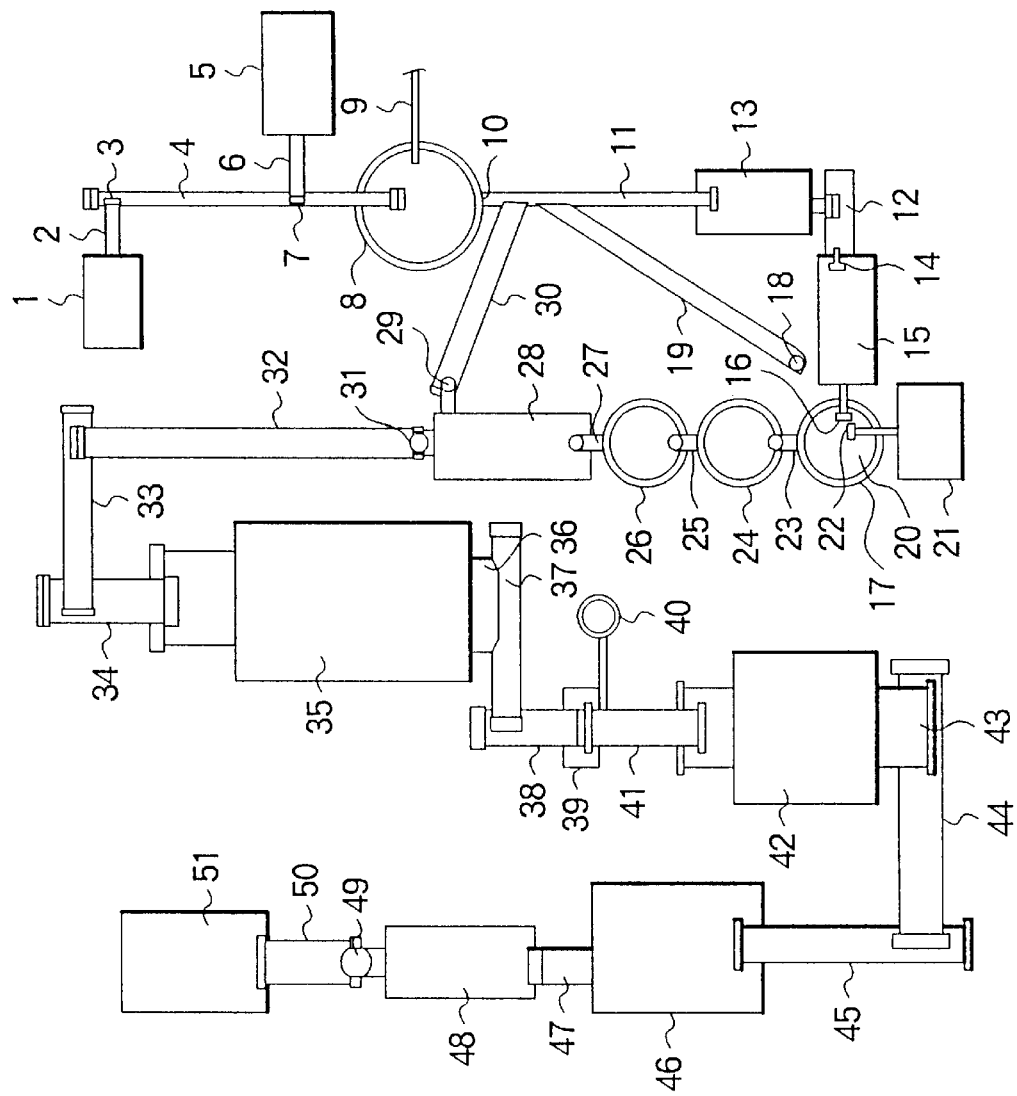
FIG. 1 is a schematic view for illustrating steps of producing a mammalian excrement treating article according to an embodiment of the present invention.

In the present invention, the term paper diaper means not only a paper diaper, a menstrual napkin, an incontinence pad and a breast pad which are usually used, but also a paper diaper waste, a menstrual napkin, an incontinence pad waste and a breast pad waste as defective products which are produced in the course of production of them. Among the paper diaper and the like, particularly, the paper diaper, menstrual napkin, incontinence pad and breast pad wastes which are defective products produced in the course of the production of the paper diaper, the menstrual napkin, the incontinence pad and the breast pad are referred to as the paper diaper waste.

In the present invention, the mammalian excrement treating article is formed, into a granular material, of only a granular core section, or a granular core section and a covering layer section covering the granular core section, and can be formed by mixing a pulverized material of the paper diaper waste (which will be referred to as a waste powder hereinafter) and an organic compounding material powder and granulating the mixture.

In the present invention, one or two or more types of paper diaper wastes are used as the paper diaper waste. Such paper diaper wastes which may be used include a paper diaper waste including a plastic material of 4,000 k calorie/kg or more such as a polyurethane, a polyethylene, a polypropylene and a polyester.

The water absorbing rate and the water retention ability of such paper diaper waste are considerably enhanced by pulverizing the paper diaper waste into a paper diaper waster powder having a particle size of 2 mm or less. However, if the paper diaper waste is pulverized into the powder having the particle size of 2 mm or less in the above manner, the granulated product made by granulation using such particles is colored into gray. When this coloring is not preferred, the powder of the paper diaper waste pulverized the particle size of 5 mm or less is used. However, apart from the coloring, it is preferable that the particle size of the paper diaper waste powder used is of 2 mm or less, because the water absorbing/retention abilities can be increased.

In the present invention, when the paper diaper is pulverized into a powder having a particle size of 5 mm or less, the particle size of portions in a plastic film and a tape is coarse and 5 to 1 mm, and the other portion of the paper diaper is more fine and has a particle size of 1 mm or less.

In the present invention, if the paper diaper waste powder is used as a starting material to form the mammalian excrement treating article, the excreted urine is retained by the water absorbable resin contained in the paper diaper waste and hence, the calorific value is lowered, but the mammalian excrement treating article is suited for an incinerating or burning-up disposal by a high calorific value of the plastic material incorporated in the paper diaper.

In the present invention, the water absorbable resin means a water absorbable resin other than a highly water-absorbable resin, and a highly water-absorbable resin. Therefore, in the present invention, the water absorbable resin includes a defective water-absorbable resin as a highly water-absorbable resin, to say nothing of a highly water-absorbable resin, and any type of the water absorbable resin can be used.

In the present invention, the highly water-absorbable resin is a resin which can maintain its shape, even if it has absorbed water in an amount which is several ten times to two hundred times its own weight. Examples of such highly water-absorbable resin are a saponified product of a copolymer of a vinyl ester and an ethylenic unsaturated carboxylic acid or the derivative thereof, a graft polymer of starch and acrylic acid, a cross-linked polyacrylic acid, a copolymer of vinyl alcohol and acrylic acid, a partially hydrolyzed polyacrylonitrile, a cross-linked carboxymethyl cellulose, a cross-linked polyethylene glycol, the salt of chitosan, and a gel of pullulan. One of these substances may be contained alone in the paper diaper waste, or two or more of these substances may be contained in the form of a mixture in the paper diaper waste.

In the present invention, the water absorbable resin which may be used includes a water absorbable resin having a poor water absorbing ability with a water absorbing rate as low as lower than 20 g/g. Examples of such water absorbable polyacrylic acid resin having such a low water absorbing ability are a fine resin having a larger particle size of, for example, 600 μm or more, and a fine resin having a smaller particle size of, for example, 10 μm or less. Such a water absorbable resin can be produced, for example, by classification from the paper diaper waste, or can be available as a product out of the specification of the polyacrylic acid resin. In the present invention, it is preferable that the water absorbable resin having a particle size of, for example, 600 μm or more is used in the granular core section, and the fine water-absorbable resin having a particle size of, for example, 10 μm or more is used in the covering section. The highly water-absorbable resin is contained in the diaper waste as described above and hence, when the paper diaper waste powder is incorporated, the water-absorbable resin may be not added, or the amount of water-absorbable resin added may be decreased by the mount contained in the paper diaper waste.

In the present invention, the water-absorbable resin such as the highly water-absorbable resin serves to enhance the water retention function of the forming mixture during formation of the mammalian excrement treating article and acts as a lubricating agent during granulation of the forming mixture. Therefore, when the amount of the water absorbable resin contained in the paper diaper waste is insufficient, water absorbable resin is added to the paper diaper waste in the granular core section. In this case, the amount of the water absorbable resin is 10% by weight of the amount of the granulated product, and preferably, 0.5 to 5% by weight.

In the present invention, if the water absorbable resin is contained in the granular core section, the water absorbable resin acts to absorb water from the periphery of the granular core section during excrement to swell and retain the water and hence, the humidity of the covering section can be regulated, which is preferable.

In the present invention, in order to ensure that the calorific value of the mammalian excrement treating article after being used is of 1,000 to 2,500 K Cal/kg and that the mammalian excrement treating article has an adsorbing and absorbing performances, an organic compounding material having a relatively high calorific value, e.g., 3,000 Cal/kg or more can be added to the paper diaper waste powder. Examples of such organic compounding material having a relatively high calorific value are a waste plastic material, a residue (which will be referred to as a coffee extraction residue hereinafter) of extraction of coffee from baked coffee beans, or used tea leaves, or a mixture of the coffee extraction residue and the used tea leaves. The waste plastic material, the residue (which will be referred to as a coffee extraction residue hereinafter) of extraction of coffee from the baked coffee beans, or the used tea leaves, or the mixture of the coffee extraction residue and the used tea leaves may be incorporated in the form as they are, or may be incorporated in the forms of a powder having a particle size of 5 mm or less, preferably, 2 mm or less.

In the present invention, in order to provide cat sands with an insecticidal function, a volatile pyrethroid-based insecticide having an insecticidal function, e.g., an empenthrine may be mixed into the paper diaper waste.

The empenthrine of the volatile pyrethroid-based insecticide used in the present invention has a contact toxic effect and is an insecticidal component, but is relatively harmless to a warm-blooded animal or mammal and hence, is used as an insecticide. The empenthrine acts to expel harmful insects such as tick or acarid and flea from the mammalian body by contact with the mammalian body. The structure of the empenthrine is represented by the following formula:

$$\begin{array}{c}CH_3\\ \phantom{CH}\diagdown\\ CH_3\end{array}C=CH-CH-CH-\overset{\overset{O}{\|}}{C}-O-CH-\overset{\overset{CH_3}{|}}{C}=CH-C_2H_5$$
$$\diagdown C\diagup\qquad\qquad|$$
$$\diagup\phantom{C}\diagdown\qquad\qquad C\equiv CH$$
$$H_3C\quad CH_3$$

In the present invention, in order to ensure that the granular mammalian excrement treating article has a insecticidal function, the volatile pyrethroid-based insecticide can be contained in the granular core section and/or in the covering layer section. The content of the empensrine of the volatile pyrethroid-based insecticide is 0.005% by weight, preferably, 0.4% by weight or more. However, the pyrethroid-based insecticide is relatively expensive, and it is preferable that the content of the pyrethroid-based insecticide is 1% by weight.

In the present invention, when the empensrine of the volatile prethloid is incorporated as an insect-repellent component in order to produce the mammalian excrement treating article having an insecticidal function, the enpenthrine can be incorporated in the paper diaper waste and/or the organic compounding material by dispersing or dissolving it into a non-alcoholic organic solvent such as an iso-paraffinic solvent, a hydrocarbon solvent, a halogenated hydrocarbon solvent or ester solvents. When the empensrine is incorporated in the mammalian excrement treating article in the above manner, the empensrine having the insecticidal function can be evaporated from the mammalian excrement treating article during excretion to come into contact with the body of a mammal or animal which is in excretion, thereby expelling an insect adhered to the body of the mammal or animal.

In the present invention, when the empenthrine of the volatile pyrethroid-based insecticide is incorporated alone in the granular core section of the mammalian excrement treating article, a solution of the empenthrine in a solvent may be added to and stirringly mixed with the paper diaper waster or the organic compounding material or the mixture of them, or may be blended by scattering or spraying it to such mixture at a granulating step. When the empenthrine of the volatile pyrethroid-based insecticide is incorporated alone in the covering layer section of the mammalian excrement treating article, the paper powder or the mixture of the paper powder and the highly water-absorbable resin in the covering layer section may be impregnated with a solution of the empenthrine in a solvent by scattering or spraying or by the other means, or the paper powder or the mixture of paper powder and the highly water-absorbable resin, which is to be covered, may be impregnated with the solution of the empenthrine in the solvent, before it is covered. In this manner, the empenthrine can be incorporated by adding it to the surface of the granular core section to form the covering layer section.

In the present invention, a powder of small pieces of wood discharged from a lumber mill may be incorporated into to the paper diaper water powder. In this case, if wood pieces of a hiba arborvitae or a sun tree are selected, the repelling of insects can be achieved because such wood pieces contain hinokitiol and a hiba oil having an insect-repellent effect.

In the present invention, by adding a powder of small wood pieces of a hiba arborvitae or a sun tree discharged from a lumber mill to the paper diaper waste powder in place of the empenthrine of the volatile pyrethroid-based insecticide, an insect expelling effect of the hiba oil and/or the hinokitiol is added to the insect expelling effect of the volatile prethloid-based insecticide and as a result, the mammalian excrement treating article has a totally increased insect expelling effect.

It is preferable that the small wood pieces of the hiba arborvitae and the small wood pieces of the sun tree are incorporated as insect expelling components into the mammalian excrement treating article along with the empensrine. In this case, the small wood pieces of the hiba arborvitae and the small wood pieces of the sun tree may be used as they are, or may be used after they are pulverized into a given particle size, e.g., of 5 mm or less, preferably, 3 mm or less, when they are incorporated in the core section, as in the organic compounding material, and of 0.5 mm or less, preferably, 0.3 mm or less, when they are incorporated in the covering layer section.

In the present invention, the small wood pieces of the hiba arborvitae and/or the small wood pieces of the sun tree can be added in amount of 5% by weight of the granular core section into the mammalian excrement treating article to ensure that the mammalian excrement treating article has a deodorizing function, an insecticidal function and a perfuming function.

In the present invention, a substance having a germicidal action may be added to the granular core section, or the covering layer section, or the granular core section and the covering layer section of the mammalian excrement treating article, in order to avoid the generation of fungi. Examples of such substance having the germicidal action are a germicide, an antiseptic agent and a fungicide such as table salt, sorbic acid or the salt thereof, calcium propionate, sodium hypochlorite, and/or benzoic acid or the salt thereof.

In the present invention, the mammalian excrement treating article is capable of preventing the generation of fungi during storage by drying it until the water content reaches 15% by weight or less, preferably, 10% by weight.

In the present invention, the organic compounding material is incorporated in the paper diaper waste in order to regulate the calorific value of the mammalian excrement treating article and to ensure that the mammalian excrement treating article has an adsorbing function. Preferred examples of such organic compounding material incorporated as described above are those having a calorific value of 3,000 kcal/kg or more such as a coffee extraction residue (for example, having a calorific value of 5,600 kcal/kg when dried), wood flour (having a calorific value of 3,000 to 5,000 kcal/kg).

In the present invention, the mammalian excrement treating article is made by mixing the organic compounding material to the paper diaper waster powder and granulating the mixture. Thereupon, in the present invention, it is preferable that the mixture is granulated into grains having a grain size of, for example, 3 mm or more, in order to avoid the presence of very fine dusts after the granulation to the utmost. However, if the mixture is granulated into a granulate having a grain size of 5 mm or more, for example, grains are difficult to scatter from a tray box into a room, and even if the grains scatter, it is easy to collect the grains. This case is also preferred for maintaining the sanitation within the room. In these cases, however, the presence of the grains having the grain size of 3 mm or less and the presence of the grains having the grain size of 5 mm or less are completely not rejected. In the present invention, the granulate may be formed into any of spherical, columnar, granular and particulate shapes and the like.

In the present invention, it is preferable that a compounding substance having a adhesive function is incorporated into the paper diaper waste in order to avoid the pulverization of the excrement treating article which is in service. Examples of such water-soluble or water-dispersible compounding substance having an adhesive function are polyvinyl alcohol (PVA), wheat flour, starch, corn starch, carboxymethyl cellulose (CMC), pullulan or gelatin. They may be used as the compounding substance, alone or in the form of a mixture made by combination of two or more of them. Examples of such alcohol-soluble compounding substance having an adhesive function are hydroxyethyl cellulose (HEC), hydroxypropyl cellulose (HPC), or vinyl pyrrolidone (PVP) and the like. Likewise, they may be used as the compounding substance, alone or in the form of a mixture made by combination of two or more of them.

When the paper powder of the covering material is adhered to the surface of the granulate of the paper diaper waste powder along with a water-soluble adhesive, an excrement such as urine is adhered to the granulate during excretion of a mammal or animal, but portions of the granulate to which the excrement such as urine has been adhered are stuck together to form a solid, which is preferable.

In the present invention, when the organic compounding material to be incorporated prior to the granulation has a water-absorbability and assumes a white or light color, it can be used as a covering material which is to be adhered to the surface of the granulate.

In the present invention, the mixture of the paper diaper waste and the organic compounding material or the mixture of the paper diaper waste, the organic compounding material and the water-absorbable resin is produced by mixing in a mixing device and granulated in a granulating device. The granulating device which may be used includes a conventionally well-known extruding granulating device.

However, in addition to the extruding granulating device, any of various granulating devices of a pan type, a drum type and a fluidized-bed type may be used. It is preferable that a compounding substance having an adhesive ability, a water-absorbable resin, a compounding substance having a germicidal action or another compounding substance is adhered to the surface of the granulate of the paper diaper waste by smearing or the like after the granulation, and then dried, so that the compounding substance adhered is easily not peeled off from the surface of the granulate.

The mammalian excrement treating article according to the present invention is formed by adding the paper powder, the highly water-absorbable resin and the compounding substance such as the volatile empensrine as an insecticide and the like to the granulate having a grain size of 3 mm or more, preferably, 5 mm or more and containing mainly the paper diaper or the paper diaper waste and the organic compounding material. Therefore, the mammalian excrement treating article can absorb well urine excreted by a mammal, has a good water retention, and can significantly exhibit an inseticidal property to a mammal or animal to which the article is used.

Moreover, the paper powder and the highly water-absorbable resin, as well as in addition to them, wheat flour, Poval, starch or another compounding substance having an adhesive ability or a substance having a germicidal action or a mixture of such two or more substances can be incorporated in the mammalian excrement treating article according to the present invention, particularly, in the covering section thereof. Therefore, the mammalian excrement treating article is adhered to the excrement discharged from a mammal or animal to wrap the excrement massively therein, and can be simply and easily post-treated. When a deodorizing agent and/or water absorbing agent is mixed, the mammalian excrement treating article exhibits further excellent deodorizing and water-absorbing properties. Further, when a substance having a germicidal action is mixed in the granular core section or the covering section, the mammalian excrement treating article can be stored for a long period without generation of fungi or the like.

In the present invention, when each of the paper diaper waster and the organic compounding material blended in the paper diaper waste has a high calorific value, an inorganic compounding material powder can be incorporated to regulate the calorific value. Examples of the inorganic compounding material powder incorporated are bentonite, zeolite, ash resulting from reburning of pulp sludge (e.g., ash resulting from incineration of FJ light or the like), vermiculite, perlite and the like. In the present invention, when the calorific value of the mammalian excrement treating article is of 2,500 kcal/kg or more after use of the mammalian excrement treating article, the inorganic compounding material powder is incorporated in order to reduce the calorific value, and it is preferable that the amount of inorganic compounding material powder incorporated is determined so that ash resulting from the incineration thereof occupies 40% by weight or less. In this case, it is preferable that the average particle size of the inorganic compounding material powder is of 2 mm or less. When each of the paper diaper waste and the inorganic compounding material powder which are to be mixed together in the above manner are pulverized into a powder having a particle size of 1 mm or less, they are easily uniformly mixed together, which is preferred.

In the present invention, when the inorganic compounding material powder used is bentonite and zeolite, it is possible to ensure that the mammalian excrement treating article has a function as a deodorizing agent.

In the mammalian excrement treating article of the present invention, the inorganic compounding material power is blended into the paper diaper waste powder and the resulting mixture is granulated. Therefore, in order to avoid the presence of very fine dusts after the granulation to the utmost, it is preferable that the mixture is granulated into a granulate having a grain size of, for example, 3 mm or more. However, if the mixture is granulated into a granulate having a grain size of 5 mm or more, for example, grains are difficult to scatter from a tray box into a room, and even if the grains scatter, it is easy to collect the grains. This case is also preferred for maintaining the sanitation within the room. In these cases, however, the presence of the grains having the grain size of 3 mm or less and the presence of the grains having the grain size of 5 mm or less are completely not rejected. In the present invention, the granulate may be formed into any of spherical, columnar, granular and particulate shapes and the like.

EMBODIMENTS

Examples of modes for carrying out the present invention will now be described with reference to the drawings, but the present invention is not limited in any way by the following description of illustration.

FIG. 1 is a schematic illustration for explaining the steps of producing a mammalian excrement treating article according to an embodiment of the present invention.

Referring to FIG. 1, a metering hopper 1 for a paper diaper waste powder is mounted and connected to a transporting path in a screw conveyer 2 of a paper diaper waste power supplying conveyer device, so that the paper diaper waste powder can be continuously supplied to the screw conveyer 2. An outlet 3 of the screw conveyer 2 for transporting the paper diaper waste powder is connected to a main screw conveyer 4. A coffee extraction residue metering hopper 5 is mounted and connected to a transporting path of a screw conveyer 6 in a coffee extraction residue supplying conveyer device, so that a coffee extraction residue can be continuously supplied to the screw conveyer 6. An outlet 7 of the screw conveyer 6 for transporting the coffee extraction residue is connected to a main screw conveyer 4.

In this embodiment, the main screw conveyer 4 is connected to a mixing device 8. In this embodiment, a water supply pipe 9 opens into the mixing device 8, so that water can be supplied to the mixing device 8. The paper diaper waste powder and the coffee extraction residue supplied to the main screw conveyer 4 are supplied to the mixing device 8, where they are mixed with water. The mixture resulting from the mixing of the paper diaper waste powder and the coffee extraction residue with the water in the mixing device is supplied from an outlet 10 in the mixing device 8 to a screw conveyer 11 in a mixture transporting conveyer device and then supplied from the mixture transporting screw conveyer 11 into an extruding-type granulating device 12.

The mixture of the paper diaper waste powder, the coffee extraction residue and the water is introduced from a hopper 13 into the extruding-type granulating device 12, where it is extruded from a die 14 to produce a columnar granulate. In this embodiment, a vibration screen classifier including an upper screen having a screen opening of 8 mm and a lower screen having a screen opening of 4 mm is mounted below the die 14 of the granulating device 12, so that grains in the extruded granulate smaller than 4 mm are separated off for regulation of the granulation to the grain size of 8 to 4 mm. The granulate fed to a vibration screen classifier 15 is loosened into individual grains. These grains are then fed from an outlet 16 above the screen having a screen opening of 4 mm in the vibration screen classifier 15 to a covering device 17 connected to the outlet 16. The grains passed through the screen having an opening of 4 mm are fed from an outlet 18 above the screen are fed to a screened grain transporting conveyer belt 19 connected to the outlet 18 below the screen and then from the screened grain transporting conveyer belt 19 through the mixture transporting screw conveyer 11 connected to the conveyer belt 19 back to the granulating device 12, wherein they are granulated again.

In this embodiment, the grains regulated to a grain size in a range of 8 to 4 mm, i.e., the grains on the screen having the opening of 4 mm are fed from the outlet 16 above the screen to the covering device 17. The covering devices are provided at three stages. At the first covering device 17, the covering powdery mixture is scattered from a supply hopper 22 in a covering material hopper 21 for the covering powdery mixture of the highly water-absorbable resin having the particle size of 0.4 mm or less and the paper powder having a particle size of 0.4 mm or less onto the granulate on the screen supplied onto a disk 20 having a rotatable shallow edge. Because the covering powdery mixture is adhered to the surface of the granulate all over, the scattered covering powdery mixture and the granulate on the screen are fed from a covering material outlet 23 of the first covering device 17 to a covering device of the same type as the first covering device 17. The covered granulate is fed from a covering material outlet 25 of the covering device 24 to a covering device 26. The granulate covered with the covering powdery mixture in the covering device 26 is fed from a covering material outlet 27 to a vibration screen type grain size-regulating device 28 including a screen having a screen opening of 10 mm at an upper stage and a screen having a screen opening of 5 mm at a lower stage, where the remaining covering powdery mixture left without adhering to the granulate and fragments of the finely-divided granulate and the like are separated off.

The mixture of the covering powdery mixture and the granulate fragments removed in the vibration screen type grain size-regulating device 28 is delivered from an outlet 29 below the screen having an opening of 5 mm to a screened grain transporting conveyer belt 30 connected to the outlet 29 and then from the screened grain transporting conveyer belt 30 through the mixture transporting screw conveyer 11 back to the granulating device 12, where it is granulated again.

The covered granulate regulated to a grain size in a range of 10 to 5 mm in the vibration screen type grain size regulating device 28 is fed from an outlet 31 above the screen having the screen opening of 5 mm in the vibration screen type grain size regulating device 28 to a first dryer 35 connected to a covered granulate transporting conveyer belt 34 by covered granulate transporting conveyer belts 32, 33 and 34.

The covered granulate fed to the first dryer is dried in the first dryer 35 which is a hot air drying machine.

The covering device and the spraying device is formed so that the covering material to be scattered or sprayed can be scattered or sprayed to the granulate at a constantly given ratio.

The covered granulate dried in the second dryer 42 is fed from an dried material outlet 43 of the second dryer 42 through dried granulate transporting conveyer belts 44 and 45 connected to the dried material outlet 43 to a product hopper 46.

The product of the dried granulate fed to the product hopper 46 is delivered from an outlet conveyer 47 of the product hopper 46 to a vibration screen type grain size-regulating device 48 including a screen having a screen opening of 10 mm at an upper stage and a screen having a screen opening of 5 mm at a lower stage, where the covered granulate having a grain size of 10 mm or more unsuitable as a product and the granulate having a grain size smaller than 5 mm are separated off. The separated-off granulates are returned through the mixture transporting screw conveyer 11 to the granulating device 12, where they are granulated again. 20 The covered granulate regulated to a grain size in a range of 10 to 5 mm in the vibration screen type grain size-regulating device 48 is fed from a regulated granulate outlet 49 above the screen having the screen opening of 5 mm in the vibration screen type grain size-regulating device 48 through a conveyer belt 50 to a granulate packing device 51, where it is packed into a sack and shipped.

The apparatus used in this embodiment is constructed in the above manner, so that a predetermined amount of paper diaper waste powder is placed into the metering hopper 1, and a predetermined amount of coffee extraction residue is placed into the metering hopper 5.

Then, the screw conveyer 2 for supplying the paper diaper waste powder, the screw conveyer 6 for supplying the coffee extraction residue and the main screw conveyer 4 are operated to supply the predetermined amount of paper diaper waster powder and the predetermined amount of coffee extraction residue to the mixing device 8, where they are mixed uniformly with water supplied through the water supply pipe 9.

The mixture of the paper diaper waster powder, the coffee extraction residue and the water is fed through the mixture transporting screw conveyer 11 which is in operation to the extruding-type granulating device 12. In this embodiment, the extruding-type granulating device 12 has a section corresponding to a bore size of 5.5 mm of the die 14 and adapted to push the mixture to be granulated by the rotation of the screw. In this embodiment, the die used has a bore diameter of 5.5 mm and a thickness of 30 mm.

The granulate grains extruded from the die 14 of the extruding type granulating device 12 are fed to the vibration screen machine, for example, having an upper screen having a screen opening of 8 mm and a lower screen having a screen opening of 4 mm, where they are screened. The grains having a grain size smaller than 4 mm and passed through the lower screen are returned through the screened-grain transporting conveyer 19 to the mixture transporting screw conveyer 11 and fed to the granulating device 12, where they are granulated again.

The grains having a grain size of 8 to 4 mm, i.e., the grains unscreened by the screen having the screen opening of 4 mm are fed from the unscreened-grain transporting outlet 16 to the rotatable disk-type covering device 17. In the covering device 17, the covering material comprised of the water-absorbable resin and the paper powder blended at a predetermined ratio is coated. The granulate covered in the covering device is fed to the subsequent covering devices 24 and 26, where the granulate is brought into contact with and covered with the covering material comprising the mixture of the water-absorbable resin and the paper powder and already scattered, while being rolled by the vibration type disk.

The granulate grains covered with the covering material in the granulate covering devices 17, 24 and 26 are loosened in the vibration screen-type gain size regulating device 28. The grains having a grain size of 10 to 5 mm are fed from the outlet 31 above the screen having the screen opening of 5 mm in the vibration screen-type gain size regulating device 28 through the conveyer belts 32, 33 and 34 to the first drier 35, where they are dried. On the other hand, the granulate grains having a grain size smaller than 5 mm are fed to the mixture transporting screw conveyer 11 by the conveyer belt 30 for transporting grains having a grain size capable of being passed through the screen having the gain size of 5 mm, and are then returned to the granulating device 12, where they are granulated again.

The temperature of the first dryer 35 for drying the granulate is maintained at a level of 80° C. or more. The dried granulate is fed to the device 39 for spraying the diluted solution of polyvinyl alcohol, in order to prevent the nappiness or the like of the covering material on the surface of the covered granulate. In the spraying device 39, the diluted solution of polyvinyl alcohol is sprayed from the spraying diluted polyvinyl alcohol solution tank 40. The covered granulate sprayed with the diluted solution of polyvinyl alcohol is delivered through the covered granulate transporting conveyer belt 41 to the second covered-granulate dryer 42 which is a hot air drying machine.

The second dryer dries the covered granulate under a lower drying temperature condition, as compared with the first dryer. The covered granulate dried in the above manner is fed to the product hopper 46. The covered granulate placed into the product hopper 46 is regulated in grain size in the grain size regulating device 48 and fed to the product packing device 51, where it is packed in a sack and shipped.

In this embodiment, the volatile empensrine, the germicide and the like are illustrated, but a solution of volatile empenthrine in a non-alcoholic organic solvent and a solution of a germicide may be sprayed along with the diluted solution of polyvinyl alcohol after drying in the first dryer. In this case, the diluted solution of polyvinyl alcohol and the solutions of empenthrine and germicide in solvents may be formed separately and may be sprayed separately or in the form of a mixture. In this embodiment, no insecticide is incorporated in the granular core section, but for example, a solution of empenthrine in a non-alcoholic organic solvent may be blended in the water-absorbable resin; supplied through the water supply pipe 17 and incorporated in the granulate. When the empenthrine is blended in the highly water-absorbable resin, it is preferable that the blending is carried out with an increased amount of the highly water-absorbable resin, and the blend is dried.

Figure 2:
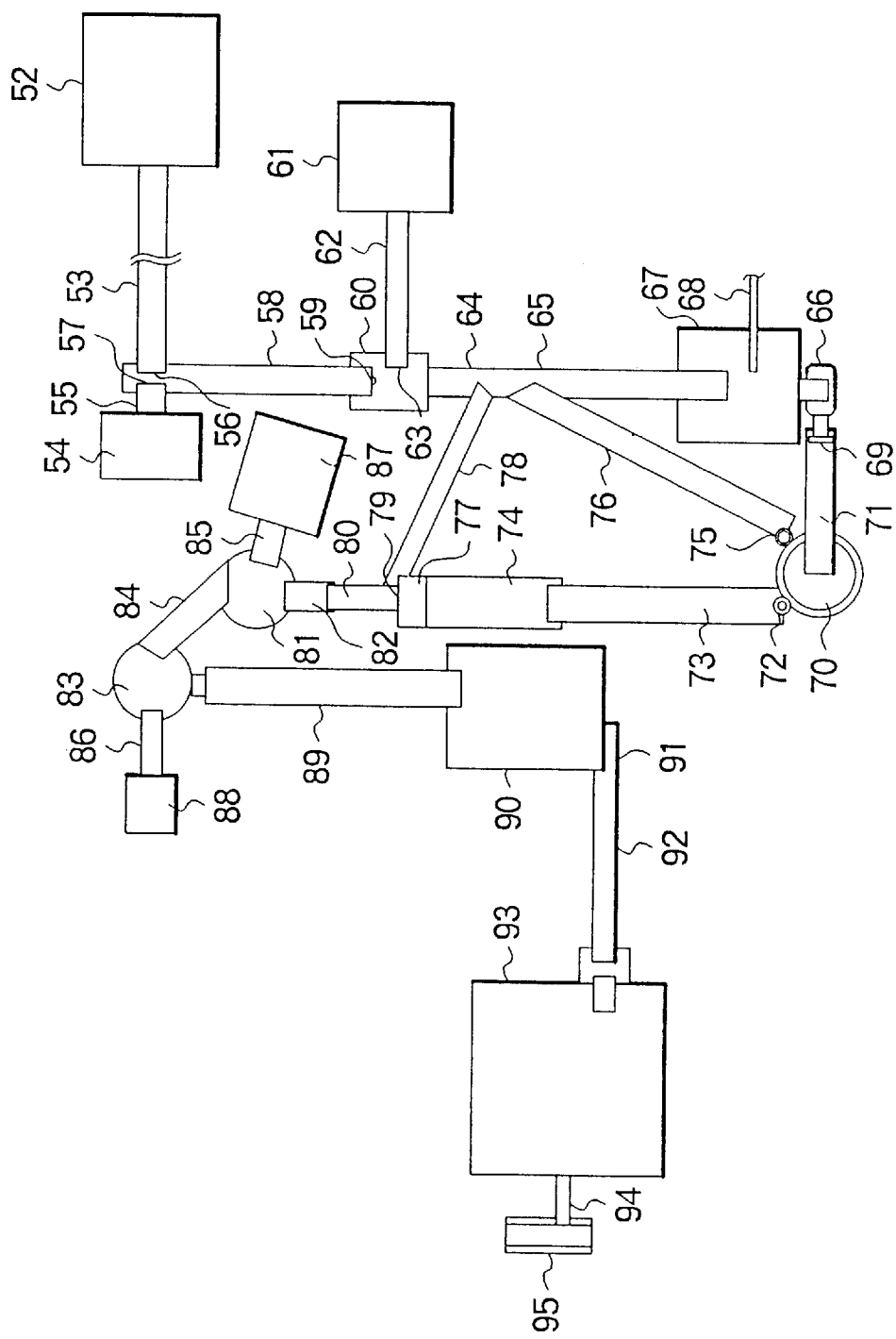
FIG. 2 is a schematic view for illustrating steps of producing a mammalian excrement treating article according to another embodiment of the present invention.

FIG. 2 is a schematic illustration for explaining a process for producing a mammalian excrement treating article according to an embodiment of the present invention different from the embodiment shown in FIG. 1.

Referring to FIG. 2, a metering hopper 52 for a paper diaper waste powder is located on a transporting path on a conveyer belt 53 of a conveyer system, so that the paper diaper waste powder can be supplied to the conveyer belt 53. A used-tea leaf hopper 54 is located on a transporting path on a conveyer belt 55 of the conveyer system, so that used tea leaves can be supplied to the conveyer belt 55. An outlet portion 56 of the conveyer belt 53 and an outlet portion 57 of the conveyer belt 55 are provided in an opposed relation to each other on a conveyer belt 58 of the conveyer system for transporting the mixture of the paper diaper waste powder and the used tea leaves. An outlet portion 59 of the conveyer belt 58 for transporting the mixture of the paper diaper waste powder and the used tea leaves is located on a mixing device 60.

In this embodiment, a metering hopper 61 for a reburnt-pulp sludge ash product powder is located on a transporting path on a conveyer belt 62 of the conveyer system, so that the reburnt-pulp sludge ash product powder can be supplied to the conveyer belt 62 of the conveyer system. An outlet portion 63 of the conveyer belt 62 for the reburnt-pulp sludge ash product powder is located on the mixing device 60.

To transport a mixture produced in the mixing device 60, a mixture transporting conveyer belt 65 is mounted at a mixture outlet 64 of the mixing device 60. The paper diaper waste powder, the used tea leaves and the reburnt-pulp sludge ash product powder are mixed in the mixing device 60, and the resulting mixture is supplied from the outlet 64 of the mixing device 60 to the mixture transporting conveyer belt 65 of the conveyer system and then from mixture transporting conveyer belt 65 to a pre-mixing device 67 in an extruding-type granulating device 66.

Water is supplied from a supply pipe 68 to the pre-mixing device 67, where the paper diaper waste powder, the used tea leaves and the reburnt-pulp sludge ash product powder are uniformly mixed.

The mixture of the paper diaper waste powder, the used tea leaves and the reburnt-pulp sludge ash product powder is introduced into the extruding-type granulating device 66 and extruded from a die 69 to form a columnar granulate. A granulate transporting conveyer belt 71 of the conveyer system for feeding the granulate formed by extrusion to a circular screen is mounted below the die 69 of the extruding-type granulating device 66.

In this embodiment, the circular screen 70 has a screen opening of 4 mm, and grains unscreened by this screen is discharged from an outlet 72 above the screen and supplied to an unscreened-grain transporting conveyer belt 73 of the conveyer system connected to the outlet 72.

The unscreened-grain transporting conveyer belt 73 is connected to a vibration-type grain size regulating device 74. The vibration-type grain size regulating device 74 is adapted to loosen the grains adhered to one another by vibration and mounted in order to reduce the pulverization of the granulate in service to the utmost. The grains unscreened by the screen is supplied to the vibration-type grain size regulating device 74 by the unscreened-grain transporting conveyer belt 73.

On the other hand, the grains screened by the circular screen 70 is returned via the mixture transporting conveyer belt 65 to the extrusion-type granulating device 66 by a screened-grain transporting conveyer belt 76 mounted at an outlet 75 below the screen, where they are granulated again.

The grains fed to the vibration-type grain size regulating device 74 are loosened one by one into individual grains by the vibration of the vibration-type grain size regulating device 74 and then delivered from the latter. In this embodiment, a screen 77 having a screen opening of 4 mm is mounted at an outlet of the vibration-type grain size regulating device 74. A screened-grain transporting conveyer belt 78 is mounted below an outlet below the screen 77 and connected to the mixture transporting conveyer belt 65, so that grains screened by the screen 77 are returned via the mixture transporting conveyer belt 65 to the extrusion-type granulating device 66 by the screened-grain transporting conveyer belt 78, where they are granulated again.

In the vibration-type grain size regulating device 74, grains having a grain size of 4 mm or more are taken out from a unscreened-grain transporting conveyer belt 80 of the conveyer system connected to an outlet 79 above the screen. An outlet of the unscreened-grain transporting conveyer belt 80 is connected to a first granulate covering device 81.

In the vibration-type grain size regulating device 74, the grains having the grain size of 4 mm or more are taken out from the unscreened-grain transporting conveyer belt 80 connected to the outlet 79 in order to cover the highly water-absorbable resin and the paper powder on a surface thereof. These grains are supplied to a screen 82 of a first granulate covering device 81 connected to the unscreened-grain transporting conveyer belt 80.

In this embodiment, both of first and second granulate covering devices 81 and 83 are vibration-type covering devices, respectively and mounted in series. An outlet of a screen classifier 84 at an outlet of the first granulate covering device 81 is connected to the second granulate covering device 83.

A first scattering screen 85 is mounted with an outlet on a vibratable covering transporting path of the first granulate covering device 81, and a second scattering spray device 86 is mounted with a spray nozzle which opens into a vibratable covering transporting path of the second granulate covering device 83. The mixture of the highly water-absorbable resin and the paper powder is scattered from the first scattering screen 85, and the diluted solution of polyvinyl alcohol is sprayed from the second scattering spray device 86.

In each of the granulate covering devices, the covering material is scattered onto the vibrated granulate to cover the granulate. The first scattering screen 85 is connected to a first covering material scattering hopper 87 in which the mixture of the highly water-absorbable resin and the paper powder is accommodated, and the second scattering spray device 86 is connected to a covering liquid tank 88 containing the diluted solution of polyvinyl alcohol accommodated therein.

The scattering screen and the scattering spray device are formed so that the covering material to be scattered can be scattered to the granulate constantly at a given ratio.

A covered-granulate transporting conveyer belt 89 of the conveyer system is connected to the second granulate covering device 83, so that the granulate covered in the second granulate covering device 83 is fed, by the covered-granulate transporting conveyer belt 89, to a drier 90 to which the covered-granulate transporting conveyer belt 89 is connected.

The covered granulate is introduced into the drier 90 which is a hot air drying machine, where it is dried. The dried granulate is fed to a product tank 93 by a dried-granulate transporting conveyer belt 92 connected to a dried granulate outlet 91. A dried granulate product is taken out into a packing area 95 by a product transporting conveyer belt of the conveyer system mounted below an outlet provided below the product tank 93, where it is packed and shipped.

The apparatus used in this embodiment is constructed in the above manner, so that a predetermined amount of the paper diaper waste powder is placed into the metering hopper 52; a predetermined amount of the used tea leaves is placed into the metering hopper 54, and a predetermined amount of a powder of burnt-pulp sludge ash product is placed into the metering hopper 61.

Then, the paper diaper waste powder supplying conveyer belt 53, the used-tea leaf supplying conveyer belt 55, the conveyer belt 58 and the burnt-pulp sludge ash product powder supplying conveyer belt 62 are operated to supply the predetermined amounts of the paper diaper waste powder, the used tea leaves and the burnt-pulp sludge ash product powder to the mixing device 60, where they are mixed together.

A resulting mixture of the paper diaper waste powder, the used tea leaves and the reburnt-pulp sludge ash product powder is delivered to the mixture transporting conveyer belt 65 which is in operation and thus, the mixture is fed to the pre-mixing device 67. Further, water is supplied through the supply pipe 68 to the pre-mixing device 67. In the pre-mixing device 67, the paper diaper waste powder, the used tea leaves, the powder of the reburnt-pulp sludge ash product and the water are uniformly mixed together. A mixture resulting from the uniform mixing is fed to the extrusion-type granulating device 66.

In this embodiment, the extrusion-type granulating device 66 has a section which is adapted to push the mixture to be granulated, by the rotation of the screw, and which corresponds to a hole in the die 69. In this embodiment, a cylindrical granulate having a diameter of 6 mm and a length of 10 mm is produced.

Grains of the granulate produced by extrusion from the die 69 of the extrusion-type granulating device 66 are fed to the circular screen having, a screen opening of 4 mm, where they are subjected to a screening. Screened grains having a grain size of 4 mm or less are returned to the mixture transporting conveyer belt 65 by the screened-grain transporting conveyer belt 76 and thus fed to the granulating device 66, where they are granulated again.

Unscreened grains having a grain size of 4 mm or more are fed to the vibration-type grain size regulating device 74, where they are loosened. The grains having a grain size of 4 mm or more are fed to the first granulate covering device 81 by the unscreened-grain transporting conveyer belt 80, where the covering material comprised of the highly water-absorbable resin and the paper powder blended at a predetermined ratio is coated to such grains to cover them.

On the other hand, the grains loosened into a grain size smaller than 4 mm in the vibration-type grain size regulating device 74 are fed from the outlet below the screen 77 to the mixture transporting conveyer belt 65 by the screened-grain transporting conveyer belt 78 and thus returned to the granulating device 66, where they are granulated again.

The granulate grains covered with the first covering material in the first granulate covering device 81 are fed from the screen classifier 84 at the outlet of the first granulate covering device 81 to the second granulate covering device 83, where a diluted solution of a second covering material is sprayed onto such grains. The granulate grains having the covering diluted solution sprayed thereon are fed from the conveyer 89 at the outlet of the second granulate covering device 83 to the dryer 90, where they are dried. The temperature of the dryer 90 is maintained at a level of 85° C. or more. The dried grains are fed to the product tank 93 by the dried-granulate transporting conveyer belt 92 to provide a product which is to be shipped.

In this embodiment, the product is provided after drying of the grains, but a solution of volatile empenthrine in a non-alcoholic solvent and a diluted solution of polyvinyl alcohol may be sprayed after the drying of the grains. In this case, the diluted solution of polyvinyl alcohol and the solution of volatile empenthrine in the non-alcoholic solvent may be formed separately and sprayed.

In addition, in this embodiment, no insecticide is incorporated in the granular core section, but for example, the solution of empenthrine in the non-alcoholic solvent may be blended in the water-absorbable resin and fed through the water supply pipe 68, whereby it may be incorporated in the granulate. When the empenthrine is blended in the highly water-absorbable resin, it is preferable that the blending is carried out with an increased amount of the highly water-absorbable resin, and the mixture is dried under a weaker drying condition.

EXAMPLE 1

This example is a case where cat sands were produced using the apparatus shown in FIG. 1. 40 Parts by weight (56% by weight upon drying) of a paper diaper waste powder resulting from pulverization into a particle size of 4 mm or less and 60 parts by weight (29% by weight upon drying) of coffee extraction residue having a water content of 65% were placed into a ribbon mixer, where they were mixed together to provide a mixture having a water content of 36% by weight. This mixture was placed into a extruding zone in the extrusion-type granulating device, where the mixture was extruded through a die including an opening having a diameter of 5.5 mm and a plate thickness of 30 mm, and a resulting material was properly chipped and granulated in a chopper. A produced granulate was regulated in grain size in the grain size regulating device and placed into the vibration type covering disk device, where a covering material comprised of a mixture of 60 parts by weight (9% by weight upon drying) of a paper powder having a particle size of 0.4 mm or less and 40 parts by weight (6% by weight upon drying) of a highly water-absorbable resin having a particle size of $150\mu$ or less was scattered onto a surface of the granulate at a proportion of 15% by weight based on the granulate to cover the granulate, while vibrating a dish-like disk. The covered granulate was loosened in the grain size regulating device and dried in the hot air drying machine, until the water content reached 14%.

A resulting product was a granulate having a grain size of 10 to 5 mm. This granulate had a calorific value of 5249 to 4935 kcal/kg upon drying, and a calorific value of 4425 to 4155 kcal/kg when the water content was of 14%. The calorific value of the cat sand product having 30 g of water absorbed thereinto, i.e., in a so-called wetted state after being used was 1183 to 1086 kcal/kg, which showed that the product after being used can be incinerated or burnt up. These gains were collected to provide sands for a cat toilet.

In a room, 30 ml of a pseudo urine made by dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 3 g. Therefore, the amount of the cat sands required for forming a coagulated mass by the pseudo urine was 17 g.

Thus, the amount of water absorbed in the toilet sands in this example was 30 g/17 g, i.e., the water absorbability was 1.75 times.

The sands for the cat toilet were laid at a thickness of 3 cm in a toilet and used. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

EXAMPLE 2

This example is a case where cat sands were produced using the apparatus shown in FIG. 1, as in Example 1. However, in place of the coffee extraction residue used in Example 1, used tea leaves were used. More specifically, 40 parts by weight (56% by weight upon drying) of a paper diaper waste powder made by pulverization of a paper diaper waste into a particle size of 4 mm or less and 60 parts by weight (29% by weight upon drying) of used tea leaves having a water content of 65% were placed into a ribbon mixer, where they are mixed together. As a result, a mixture having a water content of 39% by weight was produced. The mixture was placed into an extruding zone in the extrusion-type granulating device and extruded through a die having an opening of a diameter of 5.5 mm and having a plate thickness of 30 mm. The extruded material was properly chopped and granulated in a chopper. A resulting granulate was regulated in grain size in the grain size regulating device and placed into the vibration-type disk covering device, where a covering material comprised of a mixture of 65 parts by weight (9.75% by weight upon drying) of a paper powder having a particle size of 0.4 mm or less and 35 parts by weight (5.25% by weight upon drying) of a highly water-absorbable resin having a particle size of $150\mu$ or less was scattered onto a surface of the granulate at a proportion of 15% by weight based on the granulate to cover the granulate, while vibrating a dish-like disk. The covered granulate was loosened in the grain size regulating device and dried in the hot air drying machine, until the water content reached 14%.

A resulting product was a granulate having a grain size of 10 to 5 mm. This granulate had a calorific value of 5168 to 4851 kcal/kg upon drying, and a calorific value of 4355 to 4082 kcal/kg when the water content was of 14%. The calorific value of the cat sand product having 30 g of water absorbed in 17 g of the cat sands, i.e., in a so-called wetted state after being used was 1308 to 1202 kcal/kg, which showed that the product after being used can be incinerated or burnt up. These gains were collected to provide sands for a cat toilet.

In a room, 30 ml of a pseudo urine made by dissolving 10 g of table salt and 10 ml of aqueous ammonia into 1,000 ml of tap water was added to 20 g of the sands for the cat toilet, and a sand portion coagulated by the pseudo urine was removed. In the toilet sands in this example, the amount of a toilet sand portion which was not coagulated by the pseudo urine was 1 g. Therefore, the amount of the cat sands required for forming a coagulated mass by the pseudo urine was 19 g.

Thus, the amount of water absorbed in the toilet sands in this example was 30 g/19 g, i.e., the water absorbability was 1.58 times.

The sands for the cat toilet were laid at a thickness of 3 cm in a cat toilet and put into use. The cat used the sands as a toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

In the above-described Examples 1 and 2, the highly water-absorbable resin was used, but may be replaced by a water-absorbable resin other than the highly water-absorbable resin, e.g., a defective product of highly water-absorbable resin or a low water-absorbable resin.

When a wetted paper diaper waste and a wetted organic material are used as starting materials, water need not be supplied from the outside, if the granulation can be performed by the contained water. However, if the contained water is in an amount larger than required, then it is preferable that the same type of a paper diaper waste or another type of a paper diaper waste is added in the dehydrated or dried form to adjust the water content.

EXAMPLE 3

This example is a case where cat sands were produced using the apparatus shown in FIG. 2. 50 Parts by weight (64.4% by weight upon drying) of paper diaper waste powder, 50 parts by weight (22.6% by weight upon drying) of used tea leaves having a water content of 65% by weight, and 15 kg of water were placed into a mixer, where they were mixed to provide a mixture having a water content of 41% by weight. This mixture was placed into the extruding zone in the extrusion-type granulating device, where it was properly shopped and granulated by a chopper having an opening with a diameter of 5.5 mm and having a plate thickness of 25 mm. A mixture comprised of 60 parts by weight (7.8% by weight upon drying) of a paper powder resulting from the pulverization through a screen having a screen opening of 0.4 mm and 40 parts by weight (5.2% by weight upon drying) of highly water-absorbable resin having a particle size of 30 (m was coated to a resulting granulate, so that it occupied 13% by weight based on the granulate, and a ten-fold diluted solution of polyvinyl alcohol was sprayed thereonto. The granulate resulting from the spraying was dried in the hot air drying machine, until the water content reached 14%, thereby providing a granulate having an average diameter of 6 mm and a length of 6 to 15 mm. The granulate had a calorific value of 5211 to 4859 kcal/kg upon drying, a calorific value of 4450 to 4144 kcal/kg when the water content was of 13%, which showed that a produced mammalian excrement treating article could be incinerated or burnt up after being used. The grains of the granulate were collected to provide sands for a cat toilet.

In a room, a pseudo urine containing 1% of sodium chloride having a temperature of 35° C. was added to the sands for the cat toilet. The sands could absorb an amount of water 1 to 1.5 times the entire amount of the sands. The calorific value of the cat sands absorbing the pseudo urine at a ratio 1:1 of the cat sands to the pseudo urine was of 1905 kcal/kg.

The sands for the cat toilet were laid at a thickness of 3 cm in the cat toilet and put into use. The cat used the sands as the toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

EXAMPLE 4

This example is a case where cat sands were produced using the apparatus shown in FIG. 2, as in Example 3, but a powder of a reburnt-pulp sludge ash product was further used in addition to the materials used in Example 2. More specifically, 50 parts by weight (58.8% by weight upon drying) of a paper diaper waste powder, 40 parts by weight (16.5% by weight upon drying) of used tea leaves having a water content of 65%, 10 parts by weight (11.7% by weight) of a reburnt-pulp sludge ash product powder (11.7% by weight upon drying) and 15 kg of water were placed into and mixed in the mixer. This produced a mixture having a water content of 36% by weight. The mixture was placed into the extruding zone in the extrusion-type granulating device, where it was properly chopped and granulated by a chopper having an opening with a diameter of 5.5 mm and having a plate thickness of 25 mm. A mixture comprised of 60 parts by weight (7.8% by weight upon drying) of a paper powder having a particle size of 0.4 mm and 40 parts by weight (5.2% by weight upon drying) of highly water-absorbable resin was dusted over a surface of a resulting granulate in an amount of 13% by weight based on the granulate to cover the granulate. The surface of the covered granulate was dried by the hot air drying machine, until the water content reached 13%, thereby providing a granulate having an average diameter of 6 mm and a length of 7 to 10 mm. The granulate had a calorific value of 4580 to 4213 kcal/kg upon drying, a calorific value of 3901 to 3582 kcal/kg when the water content was of 13%, which showed that a produced mammalian excrement treating article could be incinerated or burnt up after being used. The grains of the granulate were collected to provide sands for a cat toilet.

In a room, a pseudo urine containing 1% of sodium chloride having a temperature of 35° C. was added to the sands for the cat toilet. The sands could absorb an amount of water 1 to 1.5 times the entire amount of the sands. The calorific value of the cat sands absorbing the pseudo urine at a ratio 1:1 of the cat sands to the pseudo urine was of 1631 to 1471 kcal/kg.

The sands for the cat toilet were laid at a thickness of 3 cm in the cat toilet and put into use. The cat used the sands as the toilet as usual, and as a result, there was no hindrance for use.

After the cat used the sands for excretion, that portion of the sands for cat toilet in which the cat excreted could be easily removed. Moreover, the sands for the cat toilet in this example had water-absorbing and deodorizing properties and hence, the generation of an uncomfortable odor in the room could be avoided.

In the cases of Examples 3 and 4, when a wetted paper diaper waste is used as a starting material, water need not be supplied from the outside, if the contained water enables a granulation. However, if the amount of the contained water is larger than required, then it is preferable that the same type of a paper diaper waste or another type of a paper diaper waste is added in the dehydrated or dried form to adjust the water content.

Industrial Applicability

The mammalian excrement treating article according to the present invention is produced in the form of grains having a grain size of 3 mm or more by blending the paper diaper waste powder and the organic compounding material, or the paper diaper waste powder, the organic compounding material and the inorganic compounding material powder and the like. Therefore, as compared with the conventional mammalian excrement treating article, the paper diaper waste, which has been handled as a waste matter as it is, can be effectively utilized, and when empensrine is incorporated, vapor of empensrine of an insecticide can be brought into contact with the body of mammal or animal during excretion to expel an acarid, a flea and the like living in the skin of the mammal. As compared with a collar for preventing the breeding and extermination of insects in the mammal, the empensrine vapor is only brought into contact with the body of the mammal during excretion and hence, skin disease such as redness, eczema and the like cannot be produced.

Further, the paper diaper waste used as the starting material in the present invention is one having a high calorific value, but is blended with the water-absorbable resin to produce the mammalian excrement treating article. Therefore, the mammalian excrement treating article, after being used, is discarded in a state having a high water content. Thus, to maintain a calorific value of 1,000 to 2,500 kcal/kg required when a burnable waste is discarded, the organic compounding material which is an organic waste having a high calorific value such as a plastic waste can be incorporated, thereby enabling a waste to be effectively utilized, and providing a easy disposal of the article waste, as compared with the conventional excrement treating article.

Therefore, the mammalian excrement treating article according to the present invention can be disposed of as common refuse, unlike the conventional mammalian excrement treating article, and can be easily incinerated or burnt up as a burnable waste, as compared with the conventional excrement treating article.

As described above, the mammalian excrement treating article according to the present invention is used as an excrement treating article for a domestic animal and a toy animal such as cat sands. Thus, it is possible to solve, for example, a problem concerning the discarding of the paper diaper and a problem concerning the non-burnability of the conventional used mammalian excrement treating article at one time, and to expel the insects living in the skin of a mammal or animal. The mammalian excrement treating article according to the present invention is useful in respects of an effective utilization of resources, a reduction in cost for disposal of the paper diaper waster powder, an alleviation in dealing of environmental wastes and the like.

What is claimed is:

1. A mammalian excrement treating comprising a granular form of a pulverized-paper diaper powder having a particle size of 5 mm or less, and an organic compounding material.

2. A mammalian excrement treating article according to claim 1, wherein the article after being used has a calorific value of 1,000 to 2,500 kcal/kg.

3. A mammalian excrement treating article according to claim 1, wherein said organic compounding material is a residue of extraction of baked coffee beans, used tea leaves, wood flour or a mixture thereof.

4. A mammalian excrement treating article according to claim 1, wherein the granular form comprises an amount of a water-absorbable resin equal to or larger than the amount of water-absorbable resin contained in said paper diaper waste powder in situ, and which has a calorific value of 1,000 to 2,500 kcal/kg after being used and wherein said water-absorbable resin has a water absorption capability of 20–200 capability of 20–200 times its weight.

5. A mammalian excrement treating article according to claim 4, wherein said organic compounding material is a residue of extraction of baked coffee beans, used tea leaves, wood flour, or a mixture thereof.

6. A mammalian excrement treating article according to claim 1, wherein the granular form comprises an organic compounding material powder, and which has a calorific value of 1,000 to 2,500 kcal/kg after being used.

7. A mammalian excrement treating article according to claim 6, wherein said organic compounding material is a residue of extraction of baked coffee beans, used tea leaves, wood flour or a mixture thereof.

8. A mammalian excrement treating article according to claim 1 containing an amount of pyrethroid-based insecticide smaller than the amount of water-based absorbable resin contained in situ in said paper diaper waste, and said article having a calorific value of 1,000 to 2,500 kcal/kg after being used.

9. A mammalian excrement treating article according to claim 8, wherein said organic compounding material is a residue of extraction of baked coffee beans, used tea leaves, wood flour or a mixture thereof.

10. A mammalian excrement treating article comprising a granular core section containing a powder of pulverized paper diaper waste having a particle size of 5 mm or less and an organic compounding material; and a covering layer section covering a surface of said granular core section and containing a paper powder and a water-absorbable resin power, said article being in granular form and wherein said water-absorbable resin has a water absorption capability of 20–200 times its weight.

11. A mammalian excrement treating article according to claim 10, wherein the calorific value of said article after being used is 1,000 to 2,500 kcal/kg.

12. A mammalian excrement treating article according to claim 10, wherein said organic compounding material is a residue of extraction of baked coffee beans, used tea leaves, wood flour or a mixture thereof.

13. A mammalian excrement treating article according to claim 10, wherein a volatile pyrethroid-based insecticide is contained in at least one of said granular core section and said covering layer section.

14. A mammalian excrement treating article according to claim 10, wherein a fungicide is contained in at least one of said granular core section and said covering layer.

15. A mammalian excrement treating article according to claim 10, wherein said granular core section contains an inorganic compounding powder.

16. A mammalian excrement treating article according to claim 15, wherein the calorific value of said article after being used is 1,000 to 2,500 kcal/kg.

17. A mammalian excrement treating article according to claim 15, wherein said organic compounding material is a residue of extraction of baked coffee beans, used tea leaves, wood flour or a mixture thereof.

18. A mammalian excrement treating article according to claim 15, wherein a volatile pyrethroid-based insecticide is contained in at least one of said granular core section and said covering layer section.

19. A mammalian excrement treating article according to claim 15, wherein a fungicide is contained in at least one of said granular core section and said covering layer section.

20. A mammalian excrement treating article according to claim 15, wherein said inorganic compounding material powder is a powder of bentonite, zeolite, reburnt-pulp sludge ash, vermiculite or perlite.

21. A mammalian excrement treating article according to claim 15, wherein said inorganic compounding material powder is bentonite and zeolite.

22. A mammalian excrement treating article according to claim 10, wherein said granular section contains an amount of a water-absorbable resin powder larger than the amount of water-absorbable resin contained in situ in said paper diaper waste.

23. A mammalian excrement treating article according to claim 22, wherein the calorific value of said article after being used is of 1,000 to 2,500 kcal/kg.

24. A mammalian excrement treating article according to claim 22, wherein said organic compounding material is a residue of extraction of baked coffee beans, used tea leaves, wood flour or a mixture thereof.

25. A mammalian excrement treating article according to claim 22, wherein a volatile pyrethroid-based insecticide is contained in at least one of said granular core section and said covering layer section.

26. A mammalian excrement treating article according to claim 22, wherein a fungicide is contained in at least one of said granular core section and said covering layer section.

27. A process for producing a mammalian excrement treating article, comprising the steps of pulverizing a paper diaper into a powder having a particle size of 5 mm or less; mixing said powder of the pulverized paper diaper with an organic compounding material; and granulating the mixture.

28. A process for producing a mammalian excrement treating article according to claim 27, wherein the calorific value said article after being used is of 1,000 to 2,500 kcal/kg.

29. A mammalian excrement treating article according to claim 27, wherein said organic compounding material is a residue of extraction of baked coffee beans, used tea leaves, wood flour or a mixture thereof.

30. A process for producing a mammalian excrement treating article, comprising the steps of pulverizing a paper diaper waste into a powder having a particle size of 2 mm or less; mixing said powder of the pulverized paper diaper waste with an organic compounding material; and granulating the mixture, the calorific value of said article after being used is of 1,000 to 2,500 kcal/kg.

31. A process for producing a mammalian excrement treating article according to claim 30, wherein said organic compounding material is a residue of extraction of baked coffee beans, used tea leaves, wood flour or a mixture thereof.

32. A process for producing a mammalian excrement treating article according to claim 27, further comprising the step of covering a surface of the resulting granulate with a mixture of a paper powder and a water-absorbable resin having a water absorption capability of 20–200 times its weight.

33. A process for producing a mammalian excrement treating article according to claim 32, wherein the calorific value said article after being used is of 1,000 to 2,500 kcal/kg.

34. A mammalian excrement treating article according to claim 32, wherein said organic compounding material is a residue of extraction of baked coffee beans, used tea leaves, wood flour or a mixture thereof.

35. A mammalian excrement treating article according to claim 32, wherein a volatile pyrethroid-based insecticide is present in at least one of said granulate and said mixture of the paper powder and the water-absorbable resin.

36. A process for producing a mammalian excrement treating article according to claim 32, wherein a fungicide is present in at least one of said granulate and said mixture of the paper powder and the water-absorbable resin.

37. A process for producing a mammalian excrement treating article according to claim 32, wherein said powder of the pulverized paper diaper is mixed with said organic compounding material, an inorganic compounding material powder and an amount of a water-absorbable resin powder larger than the amount of water-absorbable resin powder contained in situ in said paper diaper prior to granulating, and wherein the calorific value of said article after being used is 1,000 to 2,500 kcal/kg.

38. A process for producing a mammalian excrement treating article according to claim 37, wherein said organic compounding material is a residue of extraction of baked coffee beans, used tea leaves, wood flour or a mixture thereof.

39. A process for producing a mammalian excrement treating article according to claim 37, wherein said inorganic compounding material powder is a powder of bentonite, zeolite, reburnt-pulp sludge ash, vermiculite or perlite.

40. A mammalian excrement treating article according to claim 37, wherein said inorganic compounding material powder is bentonite and zeolite.

\* \* \* \* \*